(12) United States Patent
Alarcon et al.

(10) Patent No.: US 10,980,278 B2
(45) Date of Patent: Apr. 20, 2021

(54) METHOD, SYSTEM AND DEVICE FOR SWITCHLESS DETECTION AND CHARGING

(71) Applicant: Fontem Holdings 4 B.V., Amsterdam (NL)

(72) Inventors: Ramon Alarcon, Los Gatos, CA (US); David Blau, Chico, CA (US); Christopher Kepner, Campbell, CA (US)

(73) Assignee: Fontem Holdings 4 B.V., Amsterdam (NL)

( * ) Notice: Subject to any disclaimer, the term of this patent is extended or adjusted under 35 U.S.C. 154(b) by 0 days.

(21) Appl. No.: 16/138,773

(22) Filed: Sep. 21, 2018

(65) Prior Publication Data

US 2019/0021401 A1 Jan. 24, 2019

Related U.S. Application Data

(62) Division of application No. 14/912,141, filed as application No. PCT/US2014/051368 on Aug. 15, 2014, now Pat. No. 10,098,383.

(60) Provisional application No. 61/866,360, filed on Aug. 15, 2013.

(51) Int. Cl.
*H02J 7/00* (2006.01)
*A24F 47/00* (2020.01)

(52) U.S. Cl.
CPC .............. *A24F 47/008* (2013.01); *H02J 7/00* (2013.01); *H02J 7/00041* (2020.01); *H02J 7/0045* (2013.01); *H02J 7/0047* (2013.01); *H02J 7/0072* (2013.01); *H02J 7/007* (2013.01); *H02J 7/0048* (2020.01)

(58) Field of Classification Search
USPC .......................................... 320/114
See application file for complete search history.

(56) References Cited

U.S. PATENT DOCUMENTS

| | | | |
|---|---|---|---|
| 5,157,318 A | 10/1992 | Wang | |
| 5,717,311 A * | 2/1998 | Im | H01M 10/46 320/160 |
| 5,729,115 A | 3/1998 | Wakefield | |
| 7,642,744 B2 | 1/2010 | Zedell, Jr. et al. | |
| 7,786,706 B2 | 8/2010 | Yamashita et al. | |
| 8,217,622 B2 | 7/2012 | Stocking | |
| 2002/0053895 A1* | 5/2002 | Simoes | H02J 7/0034 320/114 |
| 2006/0071638 A1 | 4/2006 | Jones | |
| 2007/0090788 A1* | 4/2007 | Hansford | H02J 7/007 320/107 |
| 2009/0230117 A1 | 9/2009 | Fernando et al. | |
| 2009/0271644 A1* | 10/2009 | Fiebrich | G06F 1/266 713/320 |

(Continued)

FOREIGN PATENT DOCUMENTS

WO 2014008646 A1 1/2014
WO 2014029880 A2 2/2014
(Continued)

*Primary Examiner* — Samuel Berhanu
(74) *Attorney, Agent, or Firm* — Dykema Gossett PLLC

(57) ABSTRACT

A system, a method, and a device for detecting and charging electronic articles, and more particularly for charging batteries in electronic cigarettes.

12 Claims, 5 Drawing Sheets

(56) References Cited

U.S. PATENT DOCUMENTS

| | | | |
|---|---|---|---|
| 2011/0193531 A1* | 8/2011 | Sheng | H02J 7/0083 320/148 |
| 2011/0265806 A1 | 11/2011 | Alarcon et al. | |
| 2011/0279078 A1* | 11/2011 | Hara | H02J 7/027 320/107 |
| 2012/0227753 A1* | 9/2012 | Newton | A24F 47/008 131/347 |
| 2012/0235628 A1 | 9/2012 | Okabayashi et al. | |
| 2013/0341218 A1 | 12/2013 | Liu | |
| 2014/0107815 A1 | 4/2014 | LaMothe | |
| 2014/0224267 A1 | 8/2014 | Levitz et al. | |
| 2014/0348495 A1 | 12/2014 | Greim | |
| 2015/0027472 A1 | 1/2015 | Amir | |
| 2016/0120218 A1 | 5/2016 | Schennum et al. | |

FOREIGN PATENT DOCUMENTS

| | | |
|---|---|---|
| WO | 2015165813 A1 | 11/2015 |
| WO | 2016012795 A1 | 1/2016 |
| WO | 2016075028 A1 | 5/2016 |

\* cited by examiner

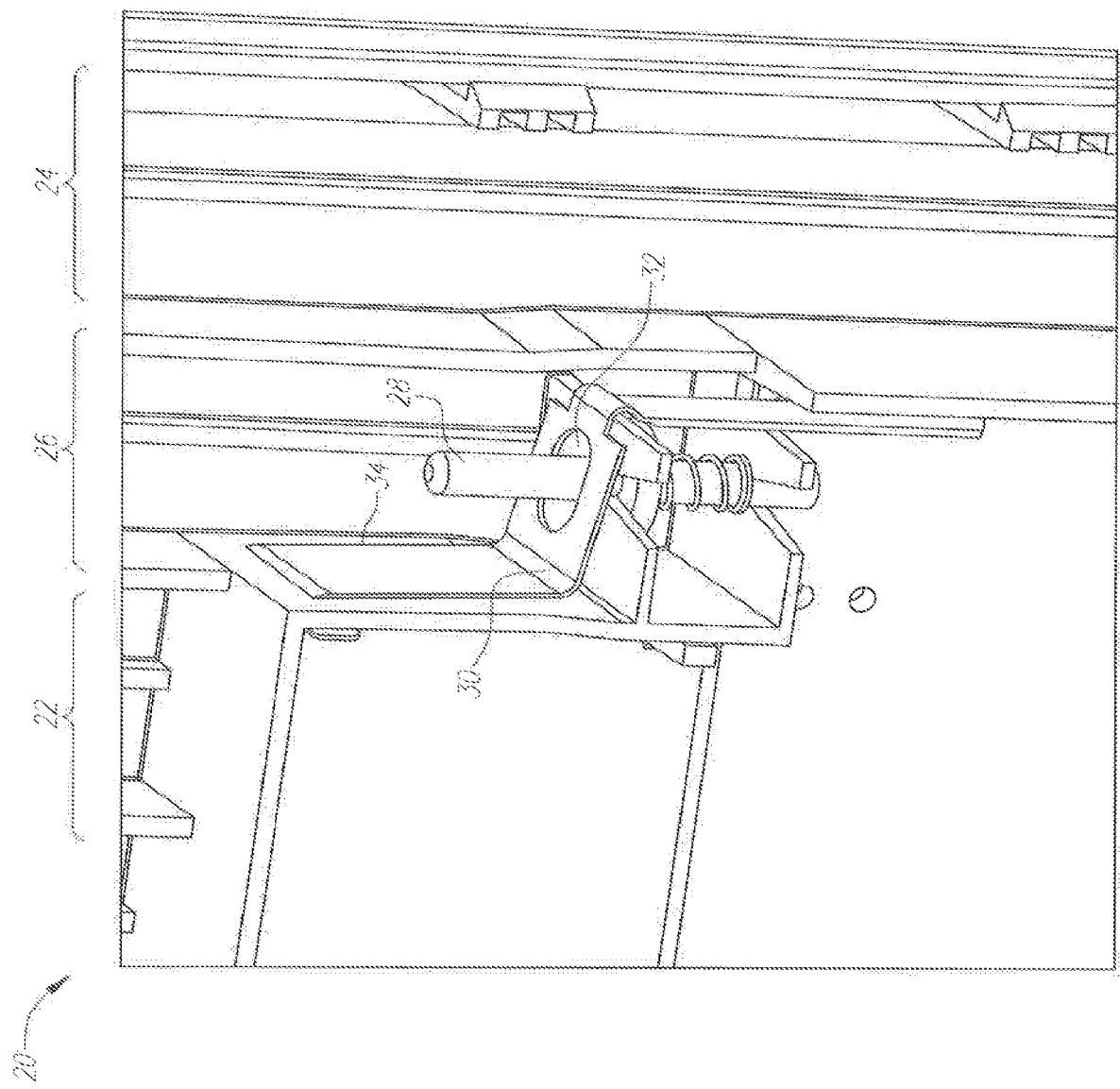

METHOD, SYSTEM AND DEVICE FOR SWITCHLESS DETECTION AND CHARGING

CROSS-REFERENCE TO RELATED APPLICATIONS

This application is a divisional application of U.S. application Ser. No. 14/912,141, filed 15 Feb. 2016 (the '141 application); which is a national stage application of International patent application no. PCT/US2014/051368, filed 15 Aug. 2014 and published as publication no. WO 2015/023996 A1 on 19 Feb. 2015 (the '368 application). This application claims priority to U.S. provisional patent application No. 61/866,360, filed 15 Aug. 2013 (the '360 application). The '141 application; the '368 application; and the '360 application are hereby incorporated by reference as though fully set forth herein.

FIELD OF THE DISCLOSURE

The present disclosure relates to a system, a method, and a device for detecting and charging electronic articles, and more particularly for charging batteries in electronic cigarettes.

BACKGROUND OF THE DISCLOSURE

Electronic cigarettes, also known as e-cigarette (eCigs) and personal vaporizers (PVs), are electronic inhalers that vaporize or atomize a liquid solution into an aerosol mist that may then be delivered to a user. A typical eCig has two main parts—a battery part and a cartomizer. The battery part typically includes a rechargeable lithium-ion (Li-ion) battery, a light emitting diode (LED), and a pressure sensor. The cartomizer typically includes a liquid solution, an atomizer and a mouthpiece. The atomizer typically includes a heating coil that vaporizes the liquid solution.

For safety reasons, the rechargeable battery is not directly connected to external contacts. Instead, a diode and a field effect transistor (FET) are connected in series with the battery connection. When a FET is used, the FET is turned on once a charging process is detected for the eCig. The eCig may be charged by placing the eCig in a charging station that is configured to receive the particular eCig. The charging station may include a charging circuit that is configured to supply power to the eCig to charge the battery.

Generally, eCig charging devices or holders (e.g., a charging station, a eCig charging pack, or the like) use a switch to detect when an eCig is placed in a station. However, switches are expensive, failure prone, and mechanically complex to implement in eCig charging holders. An unmet need exists for a low cost eCig charging holder that can detect the presence of an eCig without expending large amounts of current and without the use of a switch.

The present disclosure provides a system, a method, and a device that satisfy this unmet need, providing a simple, inexpensive, low energy consumption charging device and method.

SUMMARY OF THE DISCLOSURE

According to one non-limiting example of the disclosure, a system, a method, and a device are provided for detecting and charging of electronic articles, such as, for example, batteries. Furthermore, the system, method and device may be used to charge batteries in eCigs.

In an embodiment, a charging device for charging an electronic article, the charging device comprises the following: (a) a device charging circuit configured (i) to selectively, electrically couple with an electronic article circuit and (ii) to charge a rechargeable battery located within a portion of the electronic article and comprising part of the electronic article circuit, and (b) a microcomputer configured to do the following: (i) detect whether the charging circuit is electrically coupled with the electronic article circuit, (ii) measure a charge level of the rechargeable battery, and (iii) use the measured charge level to determine a charge mode for charging the rechargeable battery.

In another embodiment, a charging holder, configured to charge a rechargeable battery of an electronic article, comprises a spring-loaded pin contact configured to provide a first polarity of a charge signal, the spring-loaded pin contact comprising: i) a pin configured to contact the rechargeable battery, and ii) a spring-like element coupled to the pin, the spring-like element configured to hold the pin against the rechargeable battery; and an edge contact configured to provide a second polarity of the charge signal, the edge contact comprising: i) a first surface configured to contact the rechargeable battery, and ii) a second surface coupled to the first surface, the second surface comprising a hole, wherein the pin is configured to project through the hole.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 5 is a fragmentary, isometric view of an exemplary charging device with its cover removed.

Figure 1:
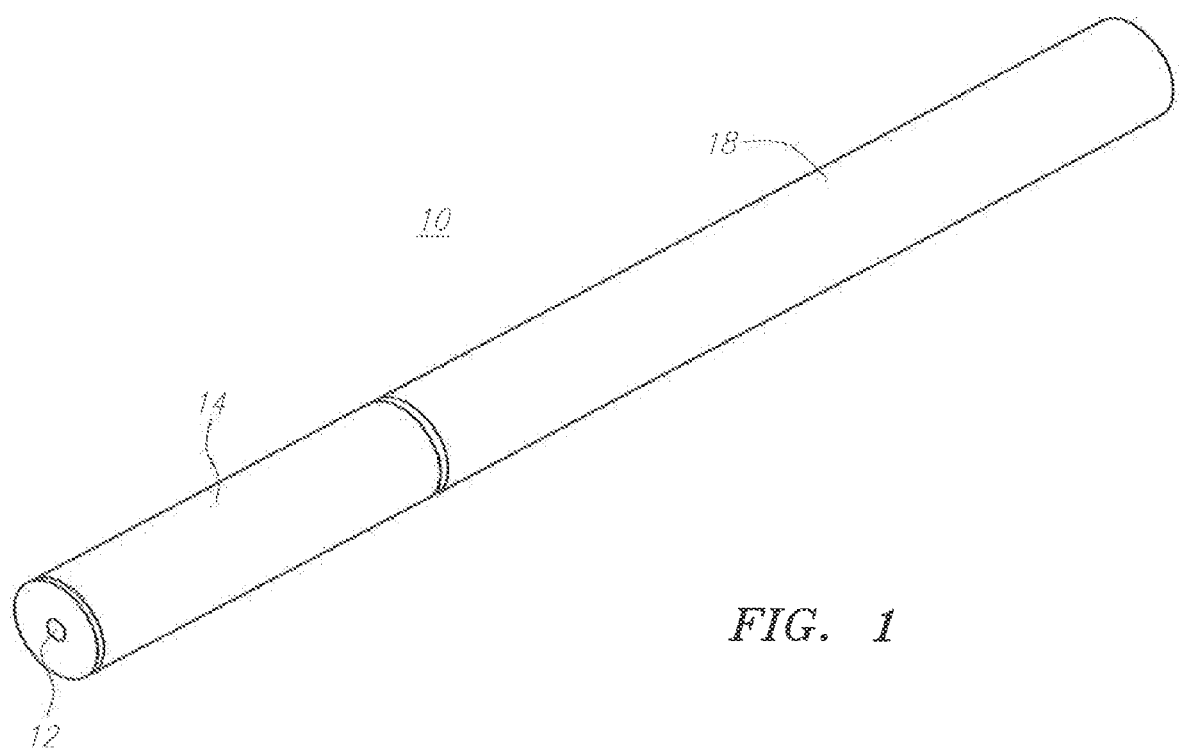
FIG. 1 shows an example of an electronic article that is constructed according to an aspect of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of an electronic article 10 according to an aspect of the disclosure. In the instant example, the electronic article 10 comprises an eCig. However, the electronic article 10 may comprise any article that may be charged by an external power supply, such as, e.g., a rechargeable battery, or the like.

The eCig 10 comprises a cartomizer 14 and a battery part 18. The cartomizer 14 comprises an opening 12 through which aerosol may be delivered to a user. The cartomizer 14 comprises a solution (not shown) and an atomizer (not shown). The solution may include, e.g., a liquid, a gel, a solid, or a gas that comprises molecules (or particles) to be delivered in an aerosol to a user. The battery part 18 includes a power supply (e.g., a rechargeable Li-ion battery) (not shown) and an LED (not shown).

Figure 2:
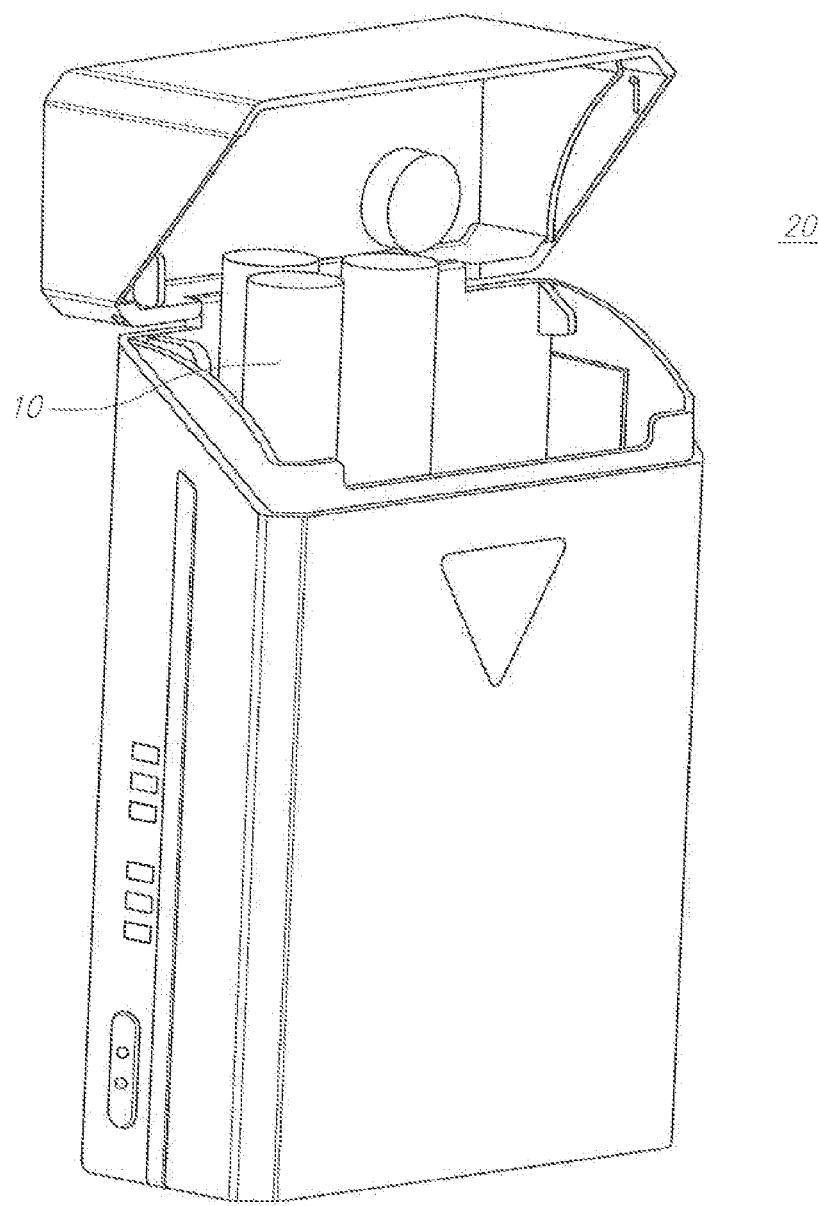
FIG. 2 shows an example of a charging holder that is constructed according to an aspect of the disclosure.

FIG. 2 shows an example of a charging holder or device (pack) 20. The pack 20 in this example comprises an eCig charging pack. The pack 20 comprises one or more regions that are configured to receive the battery part 18, and/or the cartomizer 14, and/or the entire eCig 10. In the example illustrated in FIG. 2, the pack 20 comprises a plurality of regions, each of which is configured to receive a respective eCig 10, or a component of the eCig 10 (e.g., cartomizer 14 and/or battery part 18). The pack 20 comprises a charging device 200 (shown in, for example, FIG. 4) that connects to and supplies a power to charge the power supply (e.g., Li-ion battery) in the eCig 10, or a component of the eCig 10 (e.g., cartomizer 14 and/or battery part 18).

The charging device 200 is configured to detect when the eCig 10 or a component of the eCig 10 (e.g., cartomizer 14 and/or battery part 18) (hereafter "eCig 10" will refer to the entire eCig device or one of the components, cartomizer 14 and/or battery part 18, as applicable) is placed in the eCig pack 20. The charging device 200 is further configured to detect when the eCig 10 is removed from the pack 20. In the first instance, the charging device 200 determines when to initiate a charging process. In the second instance, the charging device 200 determines when to terminate the charging process. As part of the charging process, the charging device 200 may determine whether to supply one or more charging modes: for example, trickle-charge mode, current-servo mode, voltage-servo mode, or a power off (sleep mode).

Figure 3:
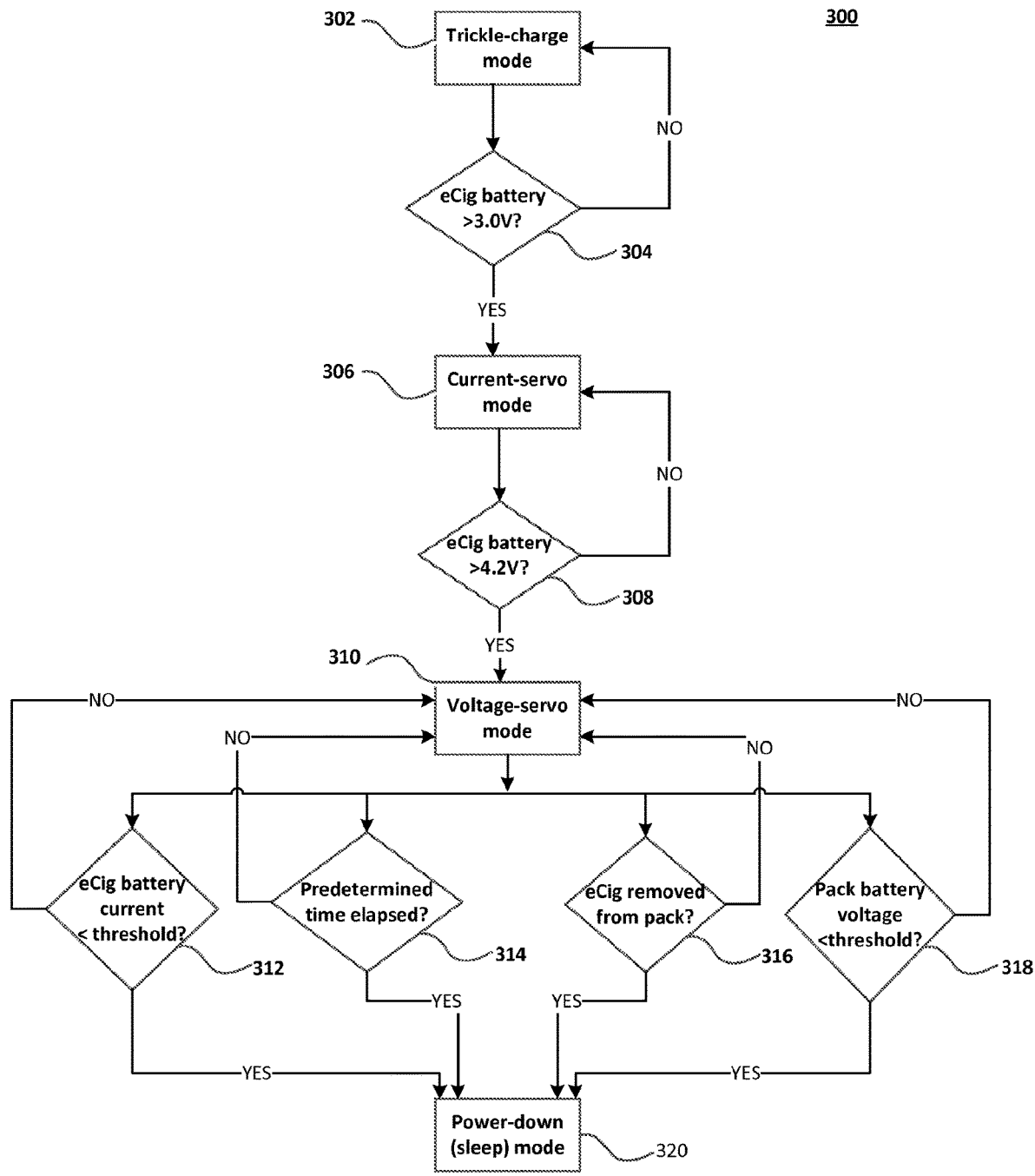
FIG. 3 is a flow chart showing an example of a method for determining which charging mode a charging device provides to an article charging circuit.

FIG. 3 depicts an exemplary method 300 by which the charging device 200 determines which charging mode to supply to the article charging circuit 100 (e.g. in the eCig 10). At step 302, the trickle-charge mode is active. The trickle-charge mode may comprise applying a source power supply signal from a source battery, in a device charging circuit 240 in FIG. 4 (e.g., a battery in the pack 20), having a current of around 10 mA, that is determined to be optimal for efficiently and effectively charging the eCig 10. The system may remain in the trickle-charge mode until the eCig battery voltage rises to a value of, for example, about 3.0V. At step 304, if the eCig battery voltage is greater than 3.0V, the system may switch to the current-servo mode at step 306. In the case of traditional eCigs, the source battery may have a voltage that is in the range of, e.g., about 3.0V to about 5.0V, and preferably around 4.2V. It is noted that the power supply signal may have a voltage that is less than 3.0V or greater than 5.0V, depending on the eCig to be charged.

The current-servo charge mode may comprise applying a source power supply signal from the source battery (e.g., a battery in the pack 20) having a current equal to the rated charge-rate of the battery cell within the eCig 10 (e.g., 80 mA for an 80 mAh cell with a 1C charge-rate, 40 ma for an 80 mAh cell with a 2C charge-rate, or a level determined to be optimal for efficiently charging the eCig 10). The system may remain in this charging mode until the eCig battery voltage rises to a value of, for example, about 4.2V. At step 308, if the eCig battery voltage is greater than 4.2V, the system may switch to the voltage-servo mode at step 310.

The voltage-servo charge mode may comprise applying a source power supply signal from the source battery to maintain the battery voltage at or around 4.2V. In this charge mode, the charging device 200 may continue to supply power to the eCig power supply until at least one of the following occurs: (a) the current of the eCig power supply goes below a predetermined current threshold (e.g., 20 mA) at step 312; (b) a predetermined time elapses (e.g., 2 minutes, 5 minutes, 10 minutes, 60 minutes) at step 314; (c) the eCig power supply is decoupled from the charging device 200 (e.g., when the eCig 10 is removed from the pack 20) at step 316; or (d) the voltage level of the source power supply in the pack 20 (e.g., in the charging device 200) drops below a predetermined threshold (e.g., below 3.2V) at step 318. If any of (a)-(d) above occur, the system may enter a power-down (sleep) mode at step 320. In an embodiment, the system 400 (shown in FIG. 4), evaluates whether any of (a)-(d) above have occurred in the order of steps 312-318, as shown. In other embodiments, the system 400 (shown in FIG. 4), can evaluate whether any of (a)-(d) above have occurred in any order.

The voltage (or current) of the source power supply signal may vary depending on the particular power supply in the eCig 10 that is to be charged by the charging device 200. In this regard, the charging device 200 may identify the particular power supply used in the eCig 10 and adjust the voltage (and/or current) of the power supply signal.

For instance, the charging device 200 may communicate with the eCig 10 to identify the particular power supply residing in the eCig 10. Alternatively (or additionally), the charging device 200 may include a transducer (not shown), such as, for example, a radio frequency identification device (RFID), an optical sensor, a magnetic sensor, or the like, that is configured to receive a radio frequency (RF) signal (e.g., from an RFID tag), an optical signal or image (e.g., bar code), read magnetically recorded information from a computer-readable medium, or the like.

Figure 4:
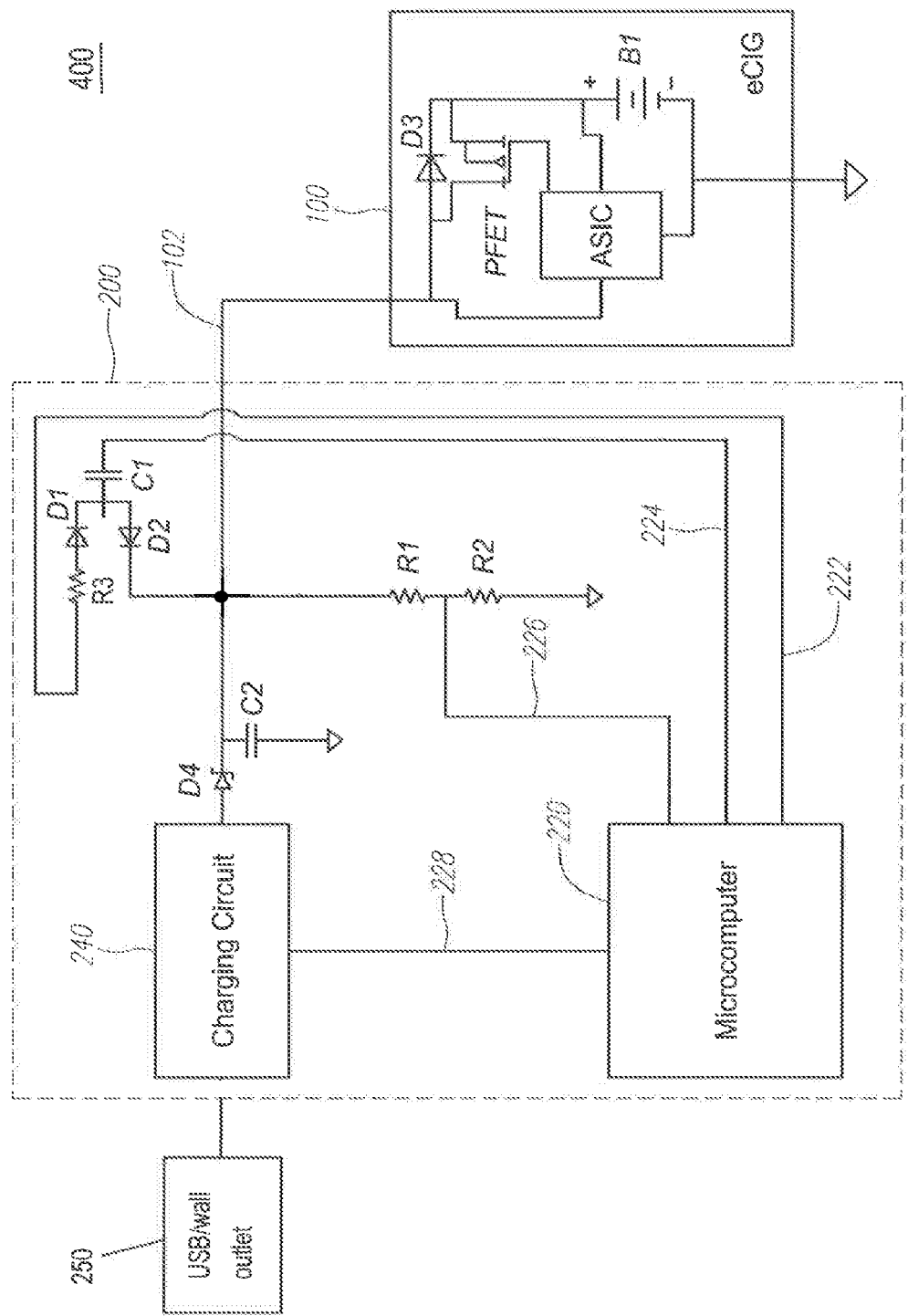
FIG. 4 shows an example of a charging method for detecting and charging an electronic article according to an aspect of the disclosure.

FIG. 4 shows an example of a charging system 400 according to an aspect of the disclosure. The charging system 400 comprises an article charging circuit 100 and the charging device 200. The article charging circuit 100 may be provided in, e.g., the eCig 10 (or cartomizer 14 and/or battery part 18). The charging device 200 may be provided in, e.g., a docking station, a charging station, a charging pack, the holder 20 (shown in FIG. 2), or the like.

According to an aspect of the disclosure, the charging device 200, may detect whether an eCig 10 is placed in the pack 20 and ready for charging by periodically supplying a source power supply signal from the source battery on the output line 102 and determining whether a load is present. For instance, the charging device 200 may drive a pulse width modulator (PWM) to periodically (e.g., every 2 seconds) supply power to the output line 102 and measure for a load. Alternatively (or additionally), the charging device 200 may periodically apply a source power supply signal to the output line 102 in response to an event, such as, e.g., a movement of the pack 20, the closing of a pack lid, manipulation of an actuator (e.g., a slide switch, a push-button switch, a touch-screen display, or the like) by the user.

In an eCig charging pack, where the pack battery (e.g., a source battery in the device charging circuit 240) is used to charge one or more eCig batteries, the average current used by the charging circuit looking for a load while an eCig is not in place may be high enough to discharge the eCig charging pack battery in, e.g., a few days. This may not be desirable. The design of the charging device 200 avoids this undesirable result as described below.

The article charging circuit 100 includes an application specific integrated circuit (ASIC), a diode D3, a p-channel field effect transistor (PFET), and a rechargeable battery B1. The ground terminals of the ASIC and battery may be coupled to an equipotentiality (e.g., ground or some other common reference). The ASIC may comprise a driver terminal that is coupled to a gate terminal of the PFET. The ASIC may include a power supply terminal that is coupled to a positive voltage terminal of the battery B1, the drain (or source) of the PFET, and the cathode of the diode D3. The ASIC may include the output line 102 that is coupled to the anode of the diode D3, the source (or drain) of the PFET, and the charging device 200.

It is noted that instead of the ASIC, the charging circuit 100 may comprise a microcomputer. Furthermore, instead of using the PFET shown in, for example, FIG. 4, an NFET could be used on the other side of the battery B1.

In the charging circuit 100, when a charging process is detected the ASIC supplies a drive signal to the gate of the PFET to close the circuit and allow the external power supply to provide a voltage through the PFET to the battery B1, thereby charging the battery.

It is noted that the pack 20 (FIGS. 2 and 5) may include a plurality of output lines 102, each line having an end coupled to the charging device 200 and an opposite end coupled to a unique contact that couples to an eCig 10. Alternatively, the output line 102 may include a bus that is connected to all of the eCig contacts in parallel.

The charging device 200 comprises a microcomputer 220 and the device charging circuit 240. The device charging circuit 240 may include a source power supply (e.g., an eCig charging pack battery configured to connect to a USB or wall outlet 250) that has adequate energy storage capacity to fully charge at least one eCig 10 power supply, and preferably to repeatedly fully charge multiple eCig power supplies (e.g., multiple eCigs 10). The charging device 200 may further include a plurality of diodes D1, D2, D4, a plurality of capacitors C1, C2, a resistor R1, and a voltage divider R2/R3. It is noted that D1, D2 may be a single dual-diode structure. The charging device 200 may be coupled to the article charging circuit 100 through the output line 102. In one non-limiting example of the charging device 200, components may have the following values: R1=100 kΩ, R2=100 kΩ, R3=10Ω; C1=1 µf; and C2=10 µf.

The microcomputer 220 may include a plurality of input/output (I/O) lines 222-228, including a eCig detection enable line 222, an eCig detection drive line 224, an eCig voltage monitor line 226, and a charger ON/OFF line 228.

As seen in FIG. 4, connecting the eCig 10 (with article charging circuit 100) to the charging pack 20 (with charging device 200) does not raise the voltage on the output line 102 because of the blocking internal diode D3 and PFET. When charging, the voltage on the output line 102 is raised to the eCig battery voltage since the PFET in the electronic article circuit 100 is turned on, thereby closing the circuit 100. When the eCig 10 is in the charging pack 20 and the charging device 200 is not on, the voltage on the output line 102 will be 0V. The voltage divider R1/R2 monitors the battery voltage during charging since the phases of the charging process depend on battery voltage.

The detection method comprises raising the voltage on the output line 102 so that it is high enough with a small current to forward bias the diode D3 in the circuit 100, and then detect the fact that the voltage on the output line 102 cannot rise to an expected open circuit voltage. Since the voltage cannot rise high enough because the diode D3 begins to conduct and the capacitor C2 will not charge as much compared to the open circuit state, a determination may be made that an eCig is in place.

The charging device 200 may be controlled by the microcomputer signals, including the eCig detection enable signal 222 and the DRIVE signal 224. Normally these signals reside at 0V, except when eCig detection is active. The voltage on these signals 222, 224 will rise to the processor supply voltage when the eCig detection is active.

Since the voltage of the eCig 10 power supply may be any voltage between, e.g., about 3V and about 4.2V, the power supplied on output line 102 should have a voltage that is greater than 4.2V plus the diode D3 voltage drop to forward bias the diode D3 in the circuit 100. Accordingly, if the diode D3 has a voltage drop of about 0.7V, then the voltage of the source power supplied on the output line 102 should be greater than 4.9V (e.g., greater than 5V). The power supplied on the output line 102 may have a voltage of, e.g., about 5.3V. The charging device 200 may supply a voltage that is greater than, e.g., 5.3V with no eCig in place, thereby making low current detection possible.

The charging system 400 may operate as follows. First, the microcomputer 220 may control the supply of a voltage of, e.g., about 3.3V to the signal line eCig detection enable 222. This may result in a voltage of, e.g., about 3V on the output line 102. Then, the microcomputer 220 may supply, e.g., a PWM voltage signal (e.g., a few kHz) to the line DRIVE 224. On each cycle of the DRIVE signal 224, the capacitor C1 will be charged and then discharged into capacitor C2. After, e.g., about 10 to about 20 cycles of the DRIVE signal 224, the voltage on the capacitor C2 will rise to about, e.g., 7.6V if there is no load on the output line 102 (i.e., no eCig 10 coupled to the line 102). If there is a load on the output line 102 (i.e., eCig 10 coupled to the line 102), then the voltage on the capacitor C2 may rise to only about, e.g., 4.6V, or less depending on the charge level of the power supply B1 in the eCig 10. So, after a few tens of cycles of the DRIVE signal 224, the voltage on the voltage monitor line 226 may be measured, and if the voltage is determined to be less than, e.g., between about 4.5V to about 6.0V, or about 5.1V, the microcomputer 220 may determine that an eCig is in place. Once a fixed number of cycles are supplied to the DRIVE line 222, the analog-to-digital (A/D) converter (not shown) in the microcomputer 220 may measure the battery B1 voltage, and the eCig detection circuit may be turned off. The entire process may take only a few milliseconds (e.g., 20 milliseconds) to carry out, and may be repeated every, e.g., 10 seconds.

The total energy needed to get the output line 102 to, e.g., about 5.3V may be twice the energy needed to charge the capacitor C2 to about 5.3V. This energy may be, e.g., about 0.3 millijoules. So the entire eCig detection process may take about 0.6 millijoules. This energy times the 0.1% duty cycle is the average current of the eCig detection circuit, or about 0.6 microamps.

It is noted that other variations of the system and method can be implemented, although the preferred embodiment is shown in FIG. 4. For example, the circuit that drives the DRIVE 224 and eCig detection enable 222 signals could be generated by a very low power CMOS gate, eliminating the microcomputer 220 current during most of the detection process.

Alternatively (or additionally), the capacitance of the capacitor C1 could be large enough, and the capacitance of the capacitor C2 could be small enough that a single rise of the voltage on the eCig detection enable line 222 followed by a single rise of the voltage on DRIVE line 224 could make the voltage on the output line 102 exceed above, e.g., 5.3V only briefly, but long enough for the microcomputer 220 to detect the voltage on the output line 102, thereby making the ON time for the microcomputer 220 very short.

Alternatively (or additionally), the frequency of the DRIVE signal 224 could be increased to, e.g., about 100 kHz, making the charging time of the capacitor C2 very short, reducing the microcomputer 220 ON time.

An alternative method for eCig detection, in instances where power consumption is not a concern, is to activate the device charging circuit 240 for the duration of the eCig detection process. Using this as the voltage source, an internal A/D measurement may be performed by the microcomputer 220 and used for eCig detection.

The microcomputer 220 may execute a computer program that may be provided on a computer-readable medium, which may comprise a code section or code segment for step described herein.

FIG. 5 illustrates an example of a charging device or holder (pack) 20. Within the charging holder 20, there are several slots for a full eCig 10, or components of an eCig. In this example, eCig cartomizer 14 can be placed in slot 22, the full eCig 10 can be placed in slot 24, and battery part 18 can be placed in slot 26. When placed in slot 26, the battery of the eCig 10 can be charged.

In order to charge an eCig battery using a charging device (e.g., a pack-docking station, or some other modality), a reliable electrical connection must be established between the battery and the charging device. A commonly used method of establishing this reliable electrical connection is to screw the charging connection of the eCig battery housing into the charging device. However, a more convenient way to make the electrical connection is by using a push-in style of contact, which also has the benefit of not requiring the user do anything more than simply pushing the eCig battery into the charging device.

In the embodiment depicted in FIG. 5, this push-in style of contact includes a spring-loaded pin contact 28 to provide one polarity of the charge signal and an edge contact 30 to provide the other polarity. For example, the spring-loaded pin contact 28 (or the edge contact 30) can be connected to a circuit board comprising charging device 200 (shown in FIG. 4) via a flexible connection, such as a wire (not shown). Likewise, the edge contact 30 (or the spring-loaded pin contact 28) can be connected to ground via a flexible connection, such as a wire (not shown).

The spring-loaded pin contact 28 can be a spring or a pin or a spring-loaded pin, as illustrated in FIG. 5. In the embodiment depicted in FIG. 5, the spring presses the charging device's spring-loaded pin contact 28 firmly against the eCig battery (not shown) and ensures electrical continuity is maintained, even if the system is jostled.

The edge contact 30 of the charging device 20 depicted in FIG. 5 can be made from a compliant conductive material, such as conductively plated spring steel. The edge contact 30 includes a hole 32 through which the spring-loaded pin contact 28 projects. The edge contact 30 is shaped so as to flex when the eCig battery is pushed into place in the charging device. The compliance of the edge contact 30 ensures a reliable electrical connection to the eCig battery, even during jostling, and accommodates for variations in the mechanical dimensions of the eCig battery and charging device.

Sometimes, debris or deposits can accumulate on the eCig battery or on the edge contact 30 of the charging device 20. Such debris or deposits can inhibit the electrical connection between the eCig battery and the charging device. To address this problem, the edge contact 30 can be configured to "self-clean." For example, the relatively vertical surface 34 of the edge contact 30 can be configured to scrape debris off the eCig battery as the eCig battery is pushed into the charging device, thereby removing any debris buildup at the sites of electrical connection.

A "computer" or "microcomputer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, or the like, or an array of processors, microprocessors, central processing units, general purpose computers, or the like.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include random access memory (RAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a flexible disk, hard disk, magnetic tape, any other magnetic medium, any other optical medium, a RAM, a PROM, an EPROM, a FLASH-EEPROM, any other memory chip or cartomizer, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols known in the art as of the date of this writing.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

What is claimed:

1. A charging device for charging an electronic smoking article, the charging device comprising the following:
   (a) a device charging circuit configured (i) to selectively, electrically couple with an electronic smoking article circuit and (ii) to charge a rechargeable battery located within a portion of the electronic smoking article and comprising part of the electronic smoking article circuit, and
   (b) a microcomputer configured to do the following: (i) use a pulse width modulation voltage signal to detect whether the charging circuit is electrically coupled with the electronic smoking article circuit, (ii) measure a charge level of the rechargeable battery, and (iii) use the measured charge level to determine a charge mode for charging the rechargeable battery;
   wherein the microcomputer is configured to direct the device charging circuit to operate in a power-down mode when one or more of the following occur: the battery of the electronic smoking article circuit has a current below a first threshold value, the battery of the device charging circuit has a voltage below a second threshold value, or the device circuit has operated in a voltage servo charge mode for a predetermined period of time.

2. The charging device of claim 1, wherein the microcomputer is further configured to detect whether the device charging circuit is electrically coupled with the electronic smoking article circuit by periodically supplying a source power supply signal from the device charging circuit to the electronic smoking article circuit.

3. The charging device of claim 2, wherein the source power supply signal allows the electronic smoking article circuit to be electronically coupled to the device charging circuit for charging the electronic smoking article circuit.

4. The charging device of claim 2, wherein the charging device further comprises a capacitor configured to be electronically coupled, in parallel, with the electronic smoking article circuit.

5. The charging device of claim 4, wherein the microcomputer is configured to determine that the capacitor is electronically coupled with the electronic smoking article circuit when a voltage of the device charging circuit fails to rise above a predetermined threshold value.

6. The charging device of claim 5, wherein the predetermined threshold value is between 4.5 volts and 6.0 volts.

7. The charging device of claim 1, wherein the microcomputer is further configured to determine the charge mode based on one or more of the following: a voltage of a battery of the electronic smoking article circuit, a current of the battery of the electronic smoking article circuit, a voltage of a battery of the device charging circuit, or a time.

8. The charging device of claim 7, wherein the microcomputer is configured to determine that when the voltage of the battery of the electronic charging circuit is below 3.0V, the charging circuit operates in a trickle charge mode to the electronic smoking article circuit.

9. The charging device of claim 7, wherein the microcomputer is configured to determine that when the voltage of the battery of the electronic charging circuit is between 3.0V and 4.2V, the charging circuit operates in a current-servo charge mode to the electronic smoking article circuit.

10. The charging device of claim 7, wherein the microcomputer is configured to determine that when the voltage of the battery of the electronic smoking article circuit is at or above 4.2V, the charging circuit operates in a voltage-servo charge mode to the electronic smoking article circuit.

11. The charging device of claim 1, wherein the device comprises part of one of a docking station, a charging station, a charging pack, or a charging holder for the electronic smoking article.

12. The charging device of claim 1, wherein the charging device further comprises a USB port or a wall outlet.

* * * * *